Figure 1:
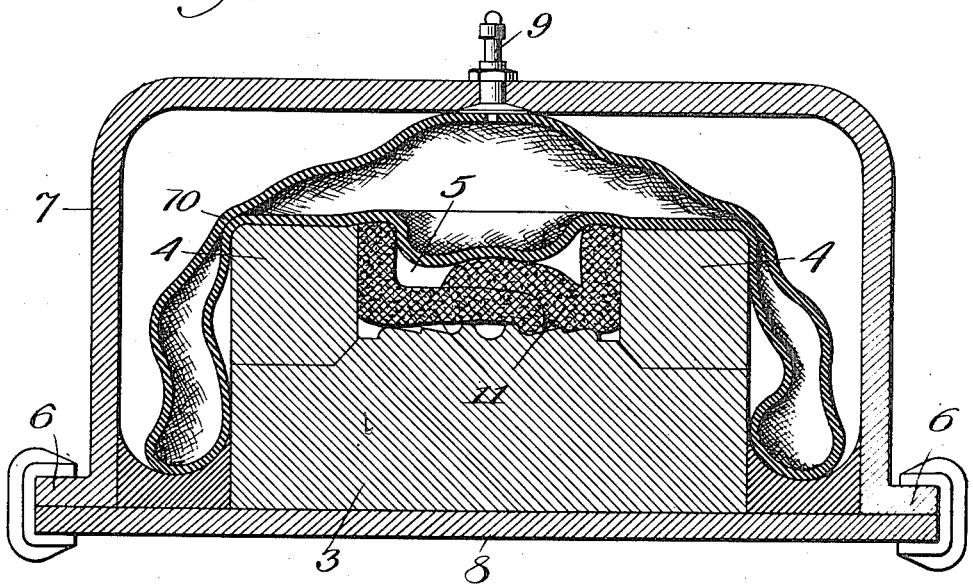

M. E. GATES.
METHOD OF MOLDING CLAY ARTICLES.
APPLICATION FILED FEB. 7, 1913.

1,177,240.

Patented Mar. 28, 1916.

UNITED STATES PATENT OFFICE.

MAJOR E. GATES, OF TERRA COTTA, ILLINOIS.

METHOD OF MOLDING CLAY ARTICLES.

1,177,240. Specification of Letters Patent. Patented Mar. 28, 1916.

Application filed February 7, 1913. Serial No. 746,773.

*To all whom it may concern:*

Be it known that I, MAJOR E. GATES, a citizen of the United States, residing at Terra Cotta, in the county of McHenry and State of Illinois, have invented a new and useful Improvement in Methods of Molding Clay Articles, of which the following is a specification.

My invention relates to an improvement in the art of molding articles of clay, which I have more immediately devised for terra-cotta work, and therefore confine thereto the description hereinafter contained.

The ordinary practice in molding such articles as terra-cotta tiles is to introduce the prepared clay in plastic condition, and which is usually provided in sheet or block form of about one and one-quarter inches in thickness, into the mold to be pressed therein to conform to its contour, after which cross-ribs of the same material are inserted, whereupon the molded article is freed from the mold, by taking the latter apart, to be subsequently transferred to a kiln and burned. The operator performs the work by pressing the clay with his hands to shape it in the mold. This is necessarily an arduous operation, slow and therefore expensive, and even with great care often results in imperfections in the article by failure to press the clay to the contour of the mold uniformly throughout the latter, and these imperfections require handling of the molded article to correct them, whereby the expense of manufacture is still further increased.

The object of my invention is to greatly expedite the molding operation and render the molded product more uniformly perfect, thereby very materially reducing the cost. This I accomplish by performing the molding with air-pressure. However, the mold used for work of the kind under consideration is a weak structure, comprising a base and separable side-walls thereon and is required to be formed of a material that will readily separate from the surfaces of the molded article, and plaster of Paris is therefore used for the mold, the sides of which are separably held together by a light metal band removably surrounding them. This mold-structure is altogether too weak, however, to withstand internal air-pressure sufficiently high (say sixty pounds to the square inch) to mold the clay, and it should, moreover, at least for greater effectiveness, be applied against a suitable flexible medium interposed between it and the clay in the mold. To counteract the weakness of the mold, referred to, I introduce the molding air-pressure under confinement not only upon the clay placed in the mold, but also about the mold-structure, thereby sustaining the latter against disruption; and as the interposed medium, referred to, I employ a bag preferably of elastic rubber, all as hereinafter described and illustrated in the accompanying drawing, in which—

Figure 2:
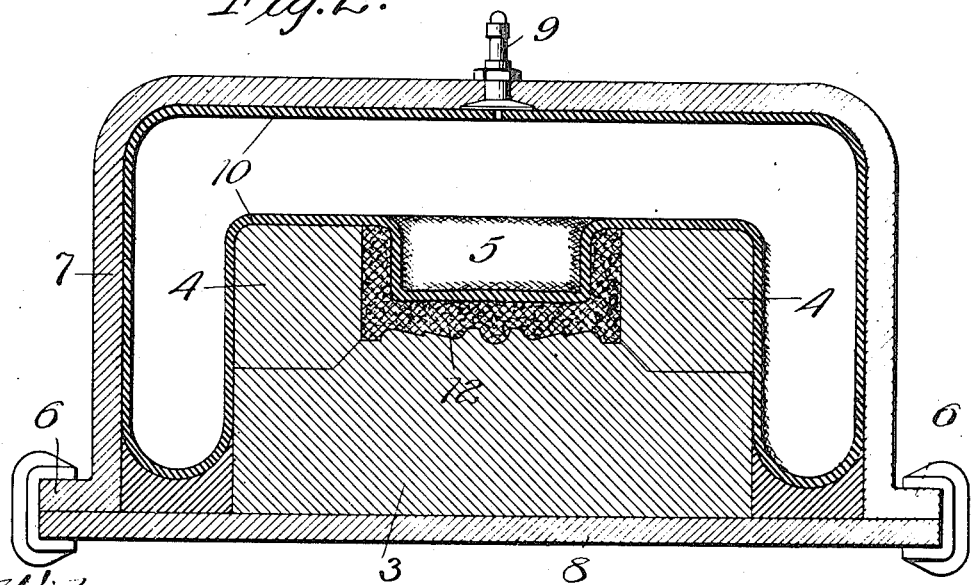

Figure 1 is a view in the cross-sectional elevation of a mold equipped with means suitable for the practice of my improvement and showing the clay laid into it preparatory to subjection thereof to my improved molding operation, and Fig. 2 is a similar view of the entire apparatus, showing the molding operation completed therein.

The mold consists of a base 3, and sides 4 secured thereon in any suitable way to render them removable with desirable facility, the parts being composed of plaster of Paris and forming the mold-chamber 5. A cover 7, preferably of cast metal, envelops the mold, being spaced about it and clamped at its base-flange 6 to a suitable bed or table 8; and air-pressure is admissible from any suitable source (not shown) into the space about the mold through a nipple 9 on the cover. A flexible medium 10, impervious to air, preferably sheet-rubber in the form of a bag lining the cover 7, extends loosely in the cover, whereby, when the latter is adjusted over the mold, the sheet covers it as an apron, as shown in Fig. 1.

To operate in accordance with my invention, pieces 11 of the prepared terra-cotta clay are laid in the mold-chamber 5 to roughly conform them to the surfaces thereof, whereupon the bag-carrying cover 7 is applied over the mold and fastened in place, and the air-pressure (of about sixty pounds, or more, to the square inch) is admitted through the nipple 9 to force the elastic material into the chamber 5 and press uniformly against all its surfaces and in absolute conformity thereto the plastic clay; and at the same time the air-pressure surrounds the mold to resist disruption thereof by the pressure exerted in its chamber. Any air that may be underneath the clay will be forced out of the mold through its joints and pores. Upon completion of the molding operation, the cover and bag are removed, and the mold is taken apart to release the molded article 12 (Fig. 2) for transfer to the kiln. The entire operation consumes a few seconds as against a few minutes in the case of small articles 12 and many minutes in the case of large articles molded in the ordinary way, with the advantage of saving in time and labor and that of performing the work more perfectly. In fact, it is fairly estimated that in large terra-cotta works employing my invention, a saving, direct and indirect, of about one-half the number of molders and of the expense of manufacture may be effected.

What I claim as new and desire to secure by Letters Patent is—

1. The method of molding plastic material in a mold having fragile walls about a mold-chamber approximating in depth the height of the walls which consists in subjecting the plastic material within the mold-chamber and also the outer surface of the walls simultaneously to fluid-pressure, whereby the outward pressure of the plastic material against the fragile walls is balanced by the exterior fluid-pressure.

2. The method of molding plastic material in a mold having fragile walls about a mold-chamber approximating in depth the height of the walls which consists in covering the mold and thereby forming a space about it within the cover, flexibly enveloping in said space the mold-chamber and forcing air under pressure into said space against the envelop to simultaneously press it against the exterior of the fragile walls and the material in the mold-chamber, for the purpose set forth.

3. The method of molding plastic material in a mold having fragile walls about a mold-chamber, which consists in covering the mold and thereby forming a space about it within the cover, enveloping in said space the mold-chamber with a flexible bag, and forcing air under pressure into the bag to expand it simultaneously against the exterior of the fragile walls and the material in the mold-chamber, for the purpose set forth.

4. The method of molding articles out of plastic clay in a mold having fragile walls about a mold-chamber, which consists in laying the plastic clay in pieces in the mold-chamber, applying over the mold a cover and a rubber bag therein to envelop the mold-chamber, and forcing air under pressure into the bag to expand it simultaneously against the exterior of the fragile walls and the plastic clay in the mold-chamber, for the purpose set forth.

MAJOR E. GATES.

In presence of—
  A. C. FISCHER,
  O. C. AVISUS.